Patented Apr. 11, 1950

2,504,003

UNITED STATES PATENT OFFICE 2,504,003

AMMONIUM SALT OF POLYMERIC N-HYDROXYMETHYL AMIC ACIDS AND WATER-REPELLENT COMPOSITIONS CONTAINING THEM

Martin E. Cupery, Wilmington, Del., assignor to E. I. du Pont de Nemours & Company, Wilmington, Del., a corporation of Delaware No Drawing. Application April 5, 1946, Serial No. 659,876

14 Claims. (Cl. 260—78)

1

This invention relates to dispersing agents and more particularly to new hydroxymethyl derivatives of polymeric amic acids and methods for their preparation.

An object of this invention is to provide new dispersing agents. A further object is to provide new dispersing agents which are water soluble, form stable dispersions and when applied in the form of coatings have superior repellency to water. Another object is to provide new hydroxymethyl derivatives of polymeric amic acids and methods for their preparation. An additional object is to provide compositions containing the novel dispersing agents and methods for preparing water repellent coatings therefrom. Other objects will appear hereinafter.

These objects are accomplished by the following invention in which new hydroxymethyl derivatives of polymeric amic acids are made by reacting the ammonium salt of a polymeric acid with formaldehyde. In actual practice, an aqueous solution of the ammonium salt of the polymeric amic acid is reacted with at least one mole equivalent of 37% aqueous formaldehyde, based on the equivalent molecular weight of the polymeric amic acid considered as being that of the structural unit.

A preferred method of preparing the new hydroxymethyl polymeric amic acids is by adding about 1.3 to 1.5 molar equivalents of 37% aqueous formaldehyde solution to a 5–20% solution of the ammonium salt of the polymeric amic acid in water and warming the solution at 30° to 100° C., for at least 10 minutes. If desired, the resulting product may be isolated by evaporation of the water.

The ammonium salt is obtained by reacting the polymeric amic acid with the required amount of ammonia as more particularly described hereinafter. The polymeric polycarboxylic acid anhydride is dissolved in a suitable organic solvent, such as methyl ethyl ketone, and ammonia is passed into the solution at ordinary temperatures until the ammonium salt of the polymeric amic acid is formed and precipitates. The ammonium salt of the polymeric amic acid may also be formed by treating the polymeric polycarboxylic acid anhydride suspended in an inert organic solvent, such as benzene, with gaseous ammonia until formation of the ammonium salt of the polymeric amic acid is completed. Instead of gaseous ammonia, a primary alkylamine may be reacted with the polymeric polycarboxylic acid anhydride to form an N-alkyl substituted polymeric amic acid, and the latter then treated with the required amount of ammonia to form the ammonium salt. Other

2 methods of preparing amic acid salts include reaction of the acid anhydride and the amine in the presence of a limited amount of water.

The term "polymeric polycarboxylic acid anhydride" as used herein refers to the interpolymers obtained by condensing a polymerizable organic compound containing an ethylenic double bond as the sole aliphatic carbon-to-carbon unsaturation with an acid anhydride having the formula

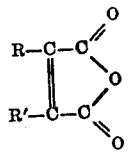

where R and R' are selected from the group consisting of hydrogen, and alkyl, aryl, aralkyl and cycloalkyl radicals. Suitable methods for effecting the condensation between the acid anhydride and the polymerizable organic compound are described in U. S. Patents 2,047,398, issued July 14, 1936, and 2,378,629, issued June 19, 1945. The interpolymers of styrene with maleic anhydride are particularly preferred for use in this invention to form hydroxymethyl derivatives of polymeric styrene/maleamic acids.

The new products of this invention are N-hydroxymethyl ammonium salts of polymeric amic acids and N-alkyl hydroxymethyl ammonium salts of polymeric amic acids, the polymeric amic acids being those obtainable by the amidation of a polymeric polycarboxylic acid anhydride. In the new products of this invention two non-oxo carbonyl groups are attached directly to adjacent carbon atoms of the polymeric chain with one of these non-oxo carbonyl groups being connected to the functional group

where R'' is hydrogen or an alkyl group and with the other of said non-oxo carbonyl groups being connected to the functional group —ONH₄.

These new hydroxymethyl derivatives of polymeric amic acids can be applied to textiles from solution or dispersion in water, aqueous ammonium hydroxide, or organic solvents containing from 1 to about 20% total solids, by dipping, spraying, spreading, brushing and similar methods. After treatment the material is dried at ordinary temperatures and then baked for a sufficient time at temperatures above 100° C. to bring about insolubilization of the coating.

This invention is further illustrated by the following examples in which the amounts are expressed in parts by weight, unless otherwise stated.

*Example I*

One hundred parts of finely divided styrene/maleic anhydride polymer (having a viscosity of about 650 centipoises, when dissolved at 15% solids concentration in methyl ethyl ketone at 25° C.) is suspended in 1000 parts of benzene and gaseous ammonia is passed for 5 hours through the suspension while stirring. The product formed is separated by filtration and allowed to dry at ordinary temperatures.

To fifteen parts of the product prepared as above, dissolved in 300 parts of water warmed to 50° C., is added 7.5 parts of 37% aqueous formaldehyde solution and the mixture is heated at 50 to 60° C., for about 15 minutes. An additional 38.4 parts of water containing 1 part of 28% ammonium hydroxide is added. The solution obtained is clear and slightly viscous, and has a pH of 5.7. The solution is heated at 85° C., and while stirring there is added 300 parts of paraffin wax heated to 85° C., and agitation is continued. The resulting dispersion is passed four times through a colloid mill of the type known commercially as "Travis Disper-Mill." The dispersion is then stirred rapidly while adding slowly 192 parts of cold water. The temperature of the dispersion, upon completion of the addition of the water, is 65° to 75° C. The dispersion thus prepared has a wax content of 25% and contains 5% of the hydroxymethyl derivative of the styrene/maleamic acid, based on the wax. The dispersion has a wax particle size of 2 to 5 microns in diameter and shows no caking or settling upon standing for several months. Upon addition of water, dilute dispersions of excellent stability are obtained and such dispersions can be applied to paper or textiles to produce excellent water repellent finishes. Textiles treated with the above wax dispersion and heated at 110° C., for 10 minutes have superior repellency to water, both initially and after an appreciable exposure to water, compared with similar textile samples coated with similar wax compositions containing polyvinyl alcohol or glue as the dispersing agents.

*Example II*

To 150 parts of a styrene/maleic anhydride polymer (having a viscosity of 1900 centipoises, at 25% solids in methyl ethyl ketone at 25° C.) dissolved in about 650 parts of acetone is added an excess of gaseous ammonia while mixing thoroughly in an internal type mixer of the Werner-Pfleiderer type. The reaction mixture forms a gel which gradually breaks up to give a finely divided product, which is readily isolated by filtration. The product, which is the ammonium salt of the styrene/maleamic acid, is washed with benzene and allowed to dry in air. The product is soluble in water and when treated with about 1.5 mole equivalents of 37% aqueous formaldehyde, the hydroxymethyl derivative is obtained.

To 14 parts of a mill base comprised of 12.6 parts of a 60% soya bean oil modified alkyd resin and 1.4 parts of titanium oxide pigment is slowly added 20 parts of a 10% aqueous solution of the above hydroxymethyl derivative of the styrene/maleamic acid. The pH of the said solution is 6.5 to 7.5. The viscous smooth dispersion of mill base thus obtained shows excellent dispersion stability. The dispersion has good brushing properties and when compounded with ordinary metallic soaps, such as those used as driers in paints, smooth durable, semi-gloss finishes which dry rapidly are obtained. The dispersion may be reduced with water without breaking. Similar compositions based on casein as the dispersing agent have poor dispersion stability, inferior resistance to water and greatly inferior durability upon exposure to outdoor weathering.

*Example III*

Through a solution of 824 parts of a styrene/maleic anhydride polymer (having a viscosity of 14 centipoises at 25% solids in methyl ethyl ketone at 25° C.) in 2000 parts of acetone is passed a stream of gaseous ammonia, while stirring in an internal type mixer such as a Werner-Pfleiderer mixer, until an excess of ammonia is present. The viscous dough formed at first gradually changes to a finely divided suspension of the ammonium salt of the polymeric styrene/maleamic acid. The product is isolated by filtration and evaporation of the acetone. A 20% solution of the product, dissolved in dilute ammonium hydroxide at a pH of 8.5, is treated with a slight excess over the molar equivalent amount of 37% aqueous formaldehyde required, and the mixture heated at 70° C., for 10 to 15 minutes. To 80 parts of this reaction mixture is added slowly with rapid agitation 20 parts of castor oil heated to 70° C. After mixing, 40 parts of water is added with continuous stirring. A smooth dispersion of fine particle size is obtained. The emulsion has excellent dispersion stability.

The above example is repeated with similar results using a low viscosity hydrocarbon oil such as that known commercially as refined mineral oil.

*Example IV*

A 5% solution of the ammonium salt of styrene/maleamic acid interpolymer prepared as described in Example I (having a viscosity of 68 centipoises at 2% solids in dilute ammonium hydroxide at 25° C.) and at pH 8.9, is treated with a slight excess of 37% aqueous formaldehyde solution, the reaction mixture flowed on a glass plate and heated at 90 to 100° C., for 10 minutes. The residual film is continuous, transparent, colorless and clear, and insoluble in water or dilute ammonium hydroxide. Films of the unmodified ammonium styrene/maleamate heated under identical conditions are soluble in water and in dilute ammonium hydroxide.

In the practice of this invention, the preferred polymeric polycarboxylic acid anhydrides are those obtained by condensing one mole of styrene with one mole of maleic anhydride and which have viscosities in the range of from 1 to 5000 centipoises at 25° C., when measured as 15% solutions in methyl ethyl ketone. Examples of other acid anhydrides which are suitable are those having the general formula

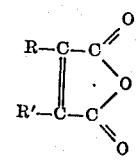

where R and R' are hydrogen, or alkyl, aryl, aralkyl or cycloaliphatic groups, such as methyl, ethyl, propyl, octyl, decyl, phenyl, tolyl, xylyl, benzyl, cyclohexyl and the like. Suitable examples of polymerizable organic compounds containing an ethylenic double bond as the sole carbon-to-carbon unsaturation are ethylene, propylene, butylene, isobutylene, styrene, indene, vinyl acetate, ethyl acrylate, methyl methacrylate and similar compounds.

The reaction in aqueous solution between the polymeric polycarboxylic amic acid, such as ammonium styrene/maleamate, and the formaldehyde can be conducted at temperatures of from 30° C. up to 100° C. and above. Usually this reaction is carried out at temperatures in the range of 50° to 75° C.

The proportion of formaldehyde employed is, as a rule, in slight excess of that theoretically required to give the monohydroxymethyl derivative of the polymeric amic acids. However, larger or smaller amounts of formaldehyde than this may be employed. It is preferred to conduct the reaction under alkaline conditions but if desired conditions which are slightly acidic, that is at a pH range of from 5 to 7 may be employed.

In the preparation of the hydroxymethyl derivatives of this invention there can be used polymeric amic acids obtained by reacting a polymeric polycarboxylic acid anhydride with ammonia, aqueous ammonia, a primary alkyl amine or a mixture of primary alkyl amines. Examples of such primary alkyl amines which can be used alone or in admixture are methyl, ethyl, propyl, butyl, amyl, hexyl, octyl, decyl, dodecyl, and octadecylamines. However, it is preferred to employ the amic acids obtained by reacting ammonia with the polymeric polycarboxylic acid anhydride resulting from the condensation of equimolar amounts of styrene with maleic anhydride, because of the ease with which the N-hydroxymethyl ammonium salts of such polymeric styrene/maleamic acids are obtained. Where a primary alkyl amine is employed in place of ammonia in the preparation of the amic acid, an N-alkyl hydroxymethyl derivative of the polymeric styrene/maleamic acid is obtained. This may then be converted to the ammonium salt by reaction with ammonia.

As many apparently widely different embodiments of this invention may be made without departing from the spirit and scope thereof, it is to be understood that I do not limit myself to the specific embodiments thereof except as defined in the appended claims.

I claim:

1. The ammonium salt of an N-hydroxymethyl polymeric amide of an interploymer of a polymerizable organic compound containing an ethylenic double bond as the sole aliphatic carbon-to-carbon unsaturation with an acid anhydride having the formula

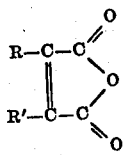

where R and R' are selected from the group consisting of hydrogen, and alkyl, aryl, aralkyl and cycloalkyl groups.

2. The ammonium salt of an N-hydroxymethyl polymeric amide as set forth in claim 1 in which said polymerizable organic compound is styrene.

3. The ammonium salt of an N-hydroxymethyl polymeric amide as set forth in claim 1 in which said acid anhydride is maleic anhydride.

4. The ammonium salt of N-hydroxymethyl polymeric styrene/maleamic acid.

5. The ammonium salt of an N-alkyl hydroxymethyl polymeric amide of an interpolymer of a polymerizable organic compound containing an ethylenic double bond as the sole aliphatic carbon-to-carbon unsaturation with an acid anhydride having the formula

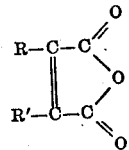

where R and R' are selected from the group consisting of hydrogen, and alkyl, aryl, aralkyl and cycloalkyl groups.

6. The ammonium salt of an N-alkyl hydroxymethyl polymeric styrene/maleamic acid.

7. A composition containing a solvent and in dispersion therein the ammonium salt of an N-hydroxymethyl polymeric amide of an interpolymer of a polymerizable organic compound containing an ethylenic double bond as the sole aliphatic carbon-to-carbon unsaturation with an acid anhydride having the formula

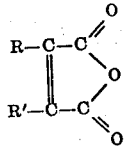

where R and R' are selected from the group consisting of hydrogen, and alkyl, aryl, aralkyl and cycloalkyl groups.

8. An article having a dried coating of the composition set forth in claim 7.

9. A composition containing a solvent and in dispersion therein the ammonium salt of N-hydroxymethyl styrene/maleamic acid.

10. A textile material having a baked coating of the composition set forth in claim 9.

11. A composition containing a solvent and in dispersion therein the ammonium salt of an N-alkyl hydroxymethyl polymeric amide of an interpolymer of a polymerizable organic compound containing an ethylenic double bond as the sole aliphatic carbon-to-carbon unsaturation with an acid anhydride having the formula

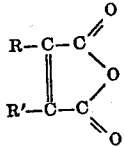

where R and R' are selected from the group consisting of hydrogen, and alkyl, aryl, aralkyl and cycloalkyl groups.

12. An article having a dried coating of the composition set forth in claim 11.

13. A composition containing a solvent and in dispersion therein the ammonium salt of an N-alkyl hydroxymethyl styrene/maleamic acid.

14. A textile material having a baked coating of the composition set forth in claim 13.

MARTIN E. CUPERY.

REFERENCES CITED

The following references are of record in the file of this patent:

UNITED STATES PATENTS

| Number | Name | Date |
| --- | --- | --- |
| 1,976,679 | Fikentscher | Oct. 9, 1934 |
| 2,373,548 | D'Alelio | Apr. 10, 1945 |
| 2,381,020 | Wilkes | Aug. 7, 1945 |